United States Patent
Chou et al.

(10) Patent No.: US 12,449,910 B2
(45) Date of Patent: Oct. 21, 2025

(54) VIRTUAL IMAGE DISPLAY SYSTEM AND CONTROL METHOD THEREOF

(71) Applicant: HTC Corporation, Taoyuan (TW)

(72) Inventors: Su Kang Chou, Taoyuan (TW); Chih Chien Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 18/507,097

(22) Filed: Nov. 13, 2023

(65) Prior Publication Data
US 2025/0155984 A1    May 15, 2025

(51) Int. Cl.
*G02B 27/01* (2006.01)
*G06F 3/01* (2006.01)

(52) U.S. Cl.
CPC ........... *G06F 3/017* (2013.01); *G02B 27/017* (2013.01)

(58) Field of Classification Search
CPC .............................. G06F 3/017; G02B 27/017
See application file for complete search history.

(56) References Cited

U.S. PATENT DOCUMENTS

| | | | |
|---|---|---|---|
| 2011/0007035 A1* | 1/2011 | Shai | G06F 3/0304 345/179 |
| 2017/0024007 A1* | 1/2017 | Pelis | G06F 3/04883 |
| 2018/0164982 A1* | 6/2018 | Rakshit | G06F 3/04815 |
| 2022/0334639 A1* | 10/2022 | Sanchez | G06F 3/017 |
| 2023/0042447 A1* | 2/2023 | Lindmeier | G06F 3/017 |

FOREIGN PATENT DOCUMENTS

| | | |
|---|---|---|
| CN | 104834372 | 8/2015 |
| CN | 112655029 | 4/2021 |
| TW | 202335707 | 9/2023 |

OTHER PUBLICATIONS

"Office Action of Taiwan Counterpart Application", issued on Jul. 11, 2024, p. 1-p. 12.

* cited by examiner

*Primary Examiner* — Rinna Yi
(74) *Attorney, Agent, or Firm* — JCIPRNET

(57) ABSTRACT

A virtual image display system and a control method thereof are provided. The virtual image display system includes a virtual image display device and an accessory. The accessory is disposed on a hand of a user and coupled to the virtual image display device. The virtual image display device is configured to: perform a gesture tracking action of the hand of the user according to positional information of the accessory; create a virtual pen and a virtual desktop according to gesture tracking information; decide whether to generate a virtual handwriting by determining a positional relationship between a pen tip of the virtual pen and the virtual desktop.

11 Claims, 5 Drawing Sheets

VIRTUAL IMAGE DISPLAY SYSTEM AND CONTROL METHOD THEREOF

FIELD OF THE INVENTION

The invention relates to a virtual image display system and a control method thereof, and in particular, to a virtual image display system capable of completing a writing action in virtual reality and a control method thereof.

DESCRIPTION OF RELATED ART

In order to perform a writing action in a virtual reality environment, products currently on the market all adopt dedicated virtual reality pens having specific specifications. Dedicated virtual reality pens of this type often have specific shapes and complex elements. And via the special shape thereof, a virtual image display device is provided for recognition, and a pressure sensor is provided to perform a positioning action of the pen.

In practical applications, virtual reality pens having special shapes often may not be recognized when a portion of the body is obscured. Moreover, this type of special-shaped pen is not suitable to be held by the hand of the user, and is not comfortable to use. The pressure sensor is also prone to damage or reduced accuracy under long-term use, affecting the overall performance of the virtual image display system.

SUMMARY OF THE INVENTION

The invention provides a virtual image display system and a control method thereof that may perform a writing action in a virtual image by creating a virtual pen.

A virtual image display system of the invention includes a virtual image display device and an accessory. The accessory is disposed on a hand of a user and coupled to the virtual image display device. The virtual image display device is configured to: perform a gesture tracking action of the hand of the user according to positional information of the accessory; create a virtual pen and a virtual desktop according to gesture tracking information; decide whether to generate a virtual handwriting by determining a positional relationship between a pen tip of the virtual pen and the virtual desktop.

A control method of a virtual image display system of the invention includes: coupling an accessory disposed on a hand of a user to a virtual image display device; making the virtual image display device perform a gesture tracking action of the hand of the user according to positional information of the accessory; making the virtual image display device create a virtual pen and a virtual desktop according to gesture tracking information; and making the virtual image display device decide whether to generate a virtual handwriting according to a positional relationship between a pen tip of the virtual pen and the virtual desktop.

Based on the above, the virtual image display device of the invention creates the virtual pen and the virtual desktop according to the positional information of the accessory. The writing action in the virtual image may be achieved with a dedicated virtual reality pen that does not require any responsibility.

DESCRIPTION OF THE EMBODIMENTS

Figure 1:
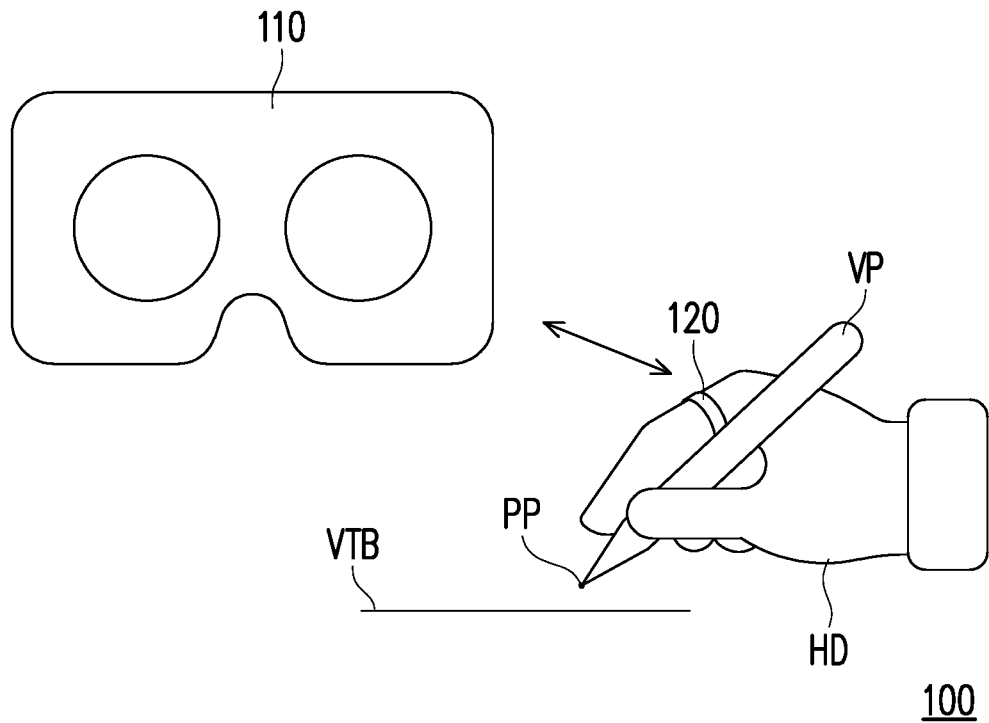
FIG. 1 shows a schematic diagram of a virtual image display system of an embodiment of the invention.

Please refer to FIG. 1. FIG. 1 shows a schematic diagram of a virtual image display system of an embodiment of the invention. The virtual image display system 100 includes a virtual image display device 110 and an accessory 120. The accessory 120 is configured to be disposed on a hand HD of a user and coupled to the virtual image display device 110. In the present embodiment, the accessory 120 may be coupled to the virtual image display device 110 via wireless connection. The virtual image display device 110 is, for example, a head-mounted display device, and may be disposed on a head of the user. The virtual image display device 110 is configured to: perform a gesture tracking action of the hand HD of the user according to positional information of the accessory; create a virtual pen VP and a virtual desktop VTB according to gesture tracking information generated by the gesture tracking action; and decide whether to generate a virtual handwriting by determining a positional relationship between a pen tip PP of the virtual pen VP and the virtual desktop VTB.

In detail, the accessory 120 may detect its own inertial state to obtain inertial information. In addition, the virtual image display device 110 may perform a shooting action on an image of the hand HD of the user and the accessory 120, and obtain the image information of the hand HD of the user. The accessory 120 may transmit the inertial information thereof to the virtual image display device 110 via wireless communication. The virtual image display device 110 may perform a gesture tracking action of the hand HD of the user according to the image information of the hand HD and the inertial information of the accessory 120. Further, the virtual image display device 110 may create the virtual pen VP according to the gesture tracking information generated by the gesture tracking action.

Moreover, the virtual image display device 110 may create the virtual desktop VTB, and display an image of the virtual pen VP and the virtual desktop VTB via the display on the virtual image display device 110. Via the image of the virtual pen VP and the virtual desktop VTB displayed by the virtual image display device 110, the user may control the virtual pen VP to be in contact with the virtual desktop VTB. Correspondingly, when the virtual image display device 110 detects that the pen tip PP of the virtual pen VP is in contact with the virtual desktop VTB, the image of the virtual handwriting may be generated corresponding to the movement trajectory of the pen tip PP.

The gesture tracking action in the present embodiment may be performed using a gesture tracking mechanism that is well known to those having ordinary skill in the art, and there is no specific limitation.

Figure 2:
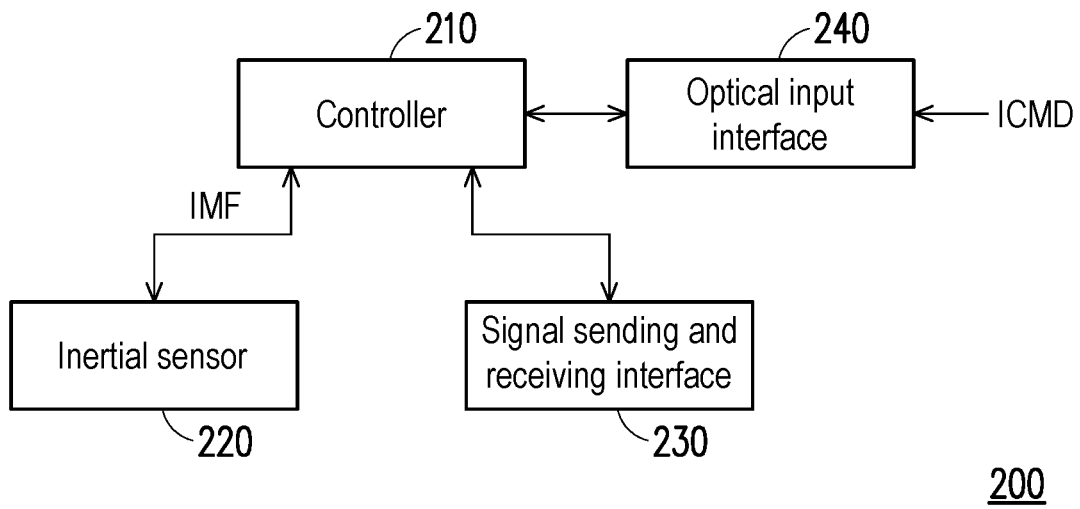
FIG. 2 shows a block diagram of an accessory in a virtual image display system of an embodiment of the invention.

Please refer to FIG. 2. FIG. 2 shows a block diagram of an accessory in a virtual image display system of an embodiment of the invention. An accessory 200 includes a controller 210, an inertial sensor 220, a signal sending and receiving interface 230, and an optical input interface 240. The controller 210 is coupled to the inertial sensor 220, the signal sending and receiving interface 230, and the optical input interface 240. The inertial sensor 220 is configured to measure the three-axis attitude angle (or angular rate) and acceleration of the accessory 200 and thereby generate inertial information. The signal sending and receiving interface 230 is a wireless communication interface configured to create a wireless connection with the virtual image display device and perform a transmission operation of a wireless signal with the virtual image display device. In the present embodiment, the signal sending and receiving interface 230 may be a Bluetooth (BT) transmission interface, or any other form of signal transmission interface, without specific limitations.

Figure 3:
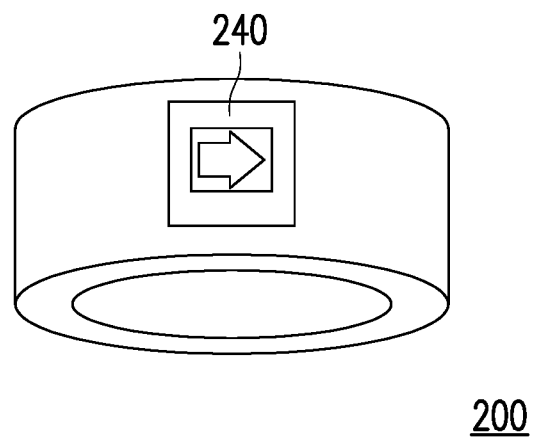
FIG. 3 shows a schematic view of the appearance of an accessory of an embodiment of the invention.

Incidentally, the accessory 200 may be provided with an optical input interface 240. The optical input interface 240 is configured to perform a receiving action of an input command. Please refer to FIG. 2 and FIG. 3 simultaneously. FIG. 3 shows a schematic view of the appearance of an accessory of an embodiment of the invention. In particular, the accessory 200 may be in the shape of a ring and may be disposed on a finger of the user. The optical input interface 240 may be disposed on the surface of the accessory 200. The optical input interface 240 performs the receiving action of an input command ICMD according to whether the received external light source is blocked. In the present embodiment, the optical input interface 240 may have an arrow symbol to remind the user to touch the optical input interface 240 according to the direction of the arrow using a finger to generate a valid input command ICMD.

Incidentally, the signal sending and receiving interface 230 may be configured to transmit the input command ICMD and inertial information to the corresponding virtual image display device.

Figure 4:
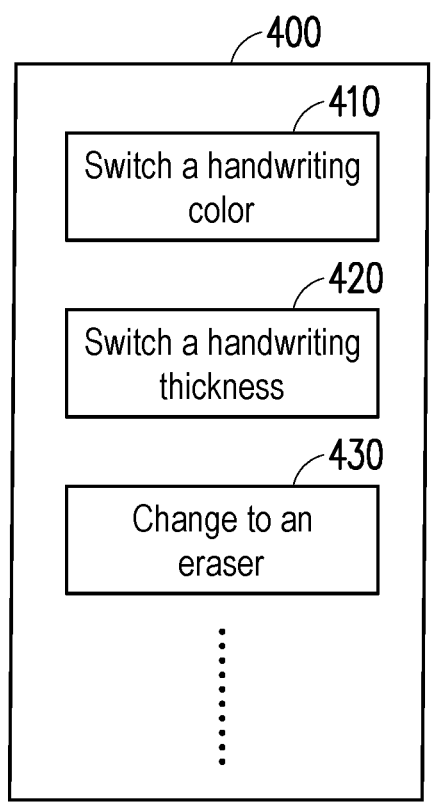
FIG. 4 shows a schematic diagram of a function menu of a virtual image display system of an embodiment of the invention.

Please refer to FIG. 4. FIG. 4 shows a schematic diagram of a function menu of a virtual image display system of an embodiment of the invention. In particular, when the user sends an input command via the optical input interface, the accessory may transmit the input command to the virtual image display device, and the virtual image display device may display a function menu 400 via the display. The function menu 400 may have a plurality of function options 410, 420, 430 . . . to provide the user with choices and to switch the functions to be performed by the virtual pen. For example, the function option 410 is configured to switch the color of the handwriting; the function option 420 is configured to switch the thickness of the handwriting; and the function option 430 is configured to change the pen tip to an eraser.

In terms of operational details, e.g., the user may quickly slide across the optical input interface using a finger to send the first input command, and thereby perform an action such as a mouse wheel to move the cursor among the plurality of function options 410 to 430. The user may press and hold the optical input interface for a relatively long time using a finger to send a second input command, and select the desired function option via the second input command. Taking the function option 410 as the selected function option as an example, the virtual image display device may further display a menu of selectable handwriting colors for the user to make a further selection.

Figure 5:
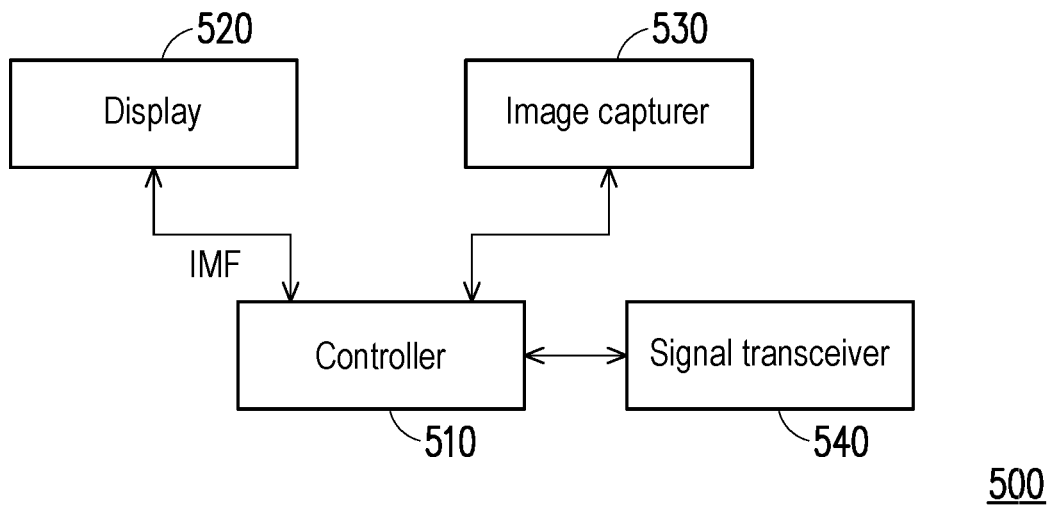
FIG. 5 shows a block diagram of a virtual image display device in a virtual image display system of an embodiment of the invention.

Please refer to FIG. 5. FIG. 5 shows a block diagram of a virtual image display device in a virtual image display system of an embodiment of the invention. A virtual image display device 500 includes a controller 510, a display 520, an image capturer 530, and a signal transceiver 540. The controller 510 is coupled to the display 520, the image capturer 530, and the signal transceiver 540. The display 520 may be any form of display. The image capture device 530 may be a camera or video camera. The signal transceiver 540 may be a wireless signal transmission interface.

In the present embodiment, the signal transceiver 540 may receive inertial information transmitted by the accessory. The image capturer 530 is configured to capture image information of the hand of the user. The controller 510 may perform a gesture tracking action of the user according to the inertial information and the image information of the hand of the user. The controller 510 may further create a virtual pen and a virtual desktop according to the gesture tracking information generated by the gesture tracking action. The virtual image display device 500 may display the virtual pen and the virtual desktop via the display 520.

Moreover, the display 520 of the virtual image display device 500 may simultaneously display the hand image of the user. The user may perform a manipulation action on the virtual pen according to the hand image in the display 520, and make the pen tip of the virtual pen be in contact with or leave the virtual desktop.

Further, the controller 510 may determine whether to perform a virtual handwriting display action according to whether the pen tip of the virtual pen is in contact with the virtual desktop. When the pen tip of the virtual pen is in contact with the virtual desktop, the display 520 may display virtual handwriting on a position corresponding to the pen tip of the virtual pen; in contrast, when the pen tip of the virtual pen leaves the virtual desktop, the display 520 may stop the display action of the virtual handwriting.

Please note here that in the embodiments of FIG. 2 and FIG. 5, the controllers 210 and 510 may be processors having computing capabilities. Or, the controllers 210 and 510 may be hardware circuits designed via Hardware Description Language (HDL) or any other digital circuit design method well known to those having ordinary knowledge in the art, and implemented via a field-programmable gate array (FPGA), a complex programmable logic device (CPLD), or an application-specific integrated circuit (ASIC).

Figure 6:
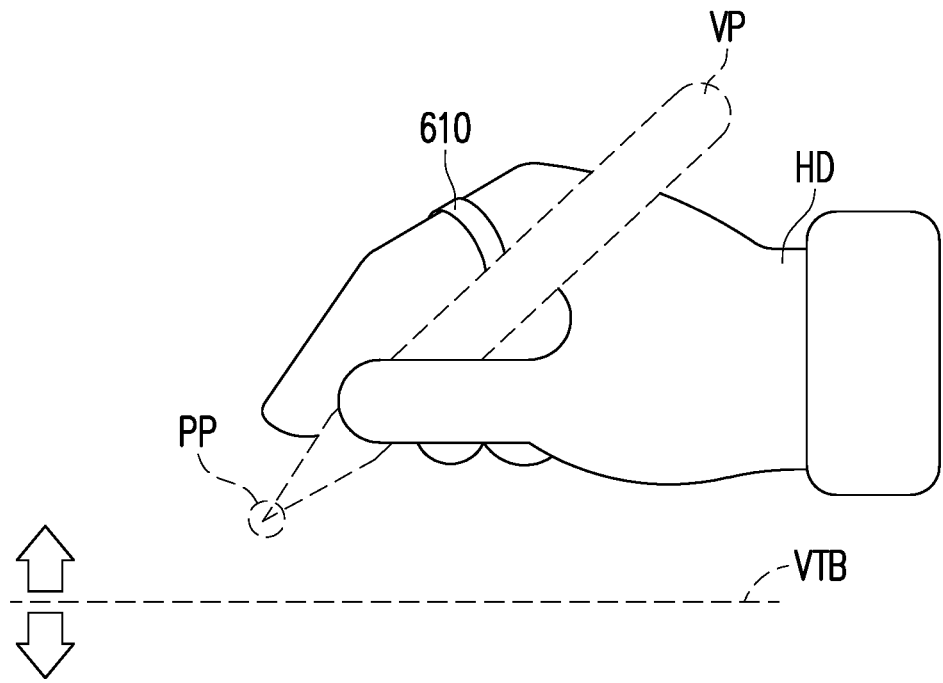
FIG. 6 shows a schematic diagram of an operation mode of a virtual image display system of an embodiment of the invention.

Please refer to FIG. 6. FIG. 6 shows a schematic diagram of the operation mode of a virtual image display system of an embodiment of the invention. In particular, in the initialization action, an accessory 610 in the virtual image display system may perform a pairing action of a wireless signal with the virtual image display device. Then, the display of the virtual image display device may display the virtual desktop VTB and the virtual pen VP. In the initial state, the extending direction of the virtual pen VP may be perpendicular to the desktop direction of the virtual desktop VTB.

Next, a user holding a physical pen in his hand is used as an example. The display may simultaneously display the image of the hand HD of the user and the physical pen. Accordingly, the user may align the pen tip of the physical pen and the pen tip PP of the virtual pen VP with each other, and after the pen tip PP of the physical pen and the virtual pen VP are finished aligning, an input command is sent to the virtual image display device via the optical input interface on the accessory. The virtual image display device may further lock the position of the virtual pen VP according to the received input command.

After completing the locking action of the position of the virtual pen VP, the user may drag (pull up or pull down) the desktop position of the virtual desktop VTB by manipulating the pen tip PP of the virtual pen VP, and thereby set the virtual desktop VTB to a suitable position.

Moreover, the user not holding a physical pen in his hand is used as an example. The display may simultaneously display the image of the hand HD of the user. Thereby, the user may hold the pen body of the virtual pen VP according to the image of the hand HD. Moreover, an input command is sent to the virtual image display device via the optical input interface on the accessory. The virtual image display device may further lock the position of the virtual pen VP according to the received input command.

Similarly, after completing the locking action of the position of the virtual pen VP, the user may drag (pull up or pull down) the desktop position of the virtual desktop VTB by manipulating the pen tip PP of the virtual pen VP, and thereby set the virtual desktop VTB to a suitable position.

It is worth mentioning that in the present embodiment, after the locking action of the position of the virtual pen VP is completed, the display may display an image of the virtual pen VP held by the hand HD of the user (as shown in FIG. 6).

After the initialization action is completed, the user may control the pen tip of the virtual pen VP to be in contact with or leave the virtual desktop VTB, and thereby perform a writing action of virtual handwriting.

Figure 7:
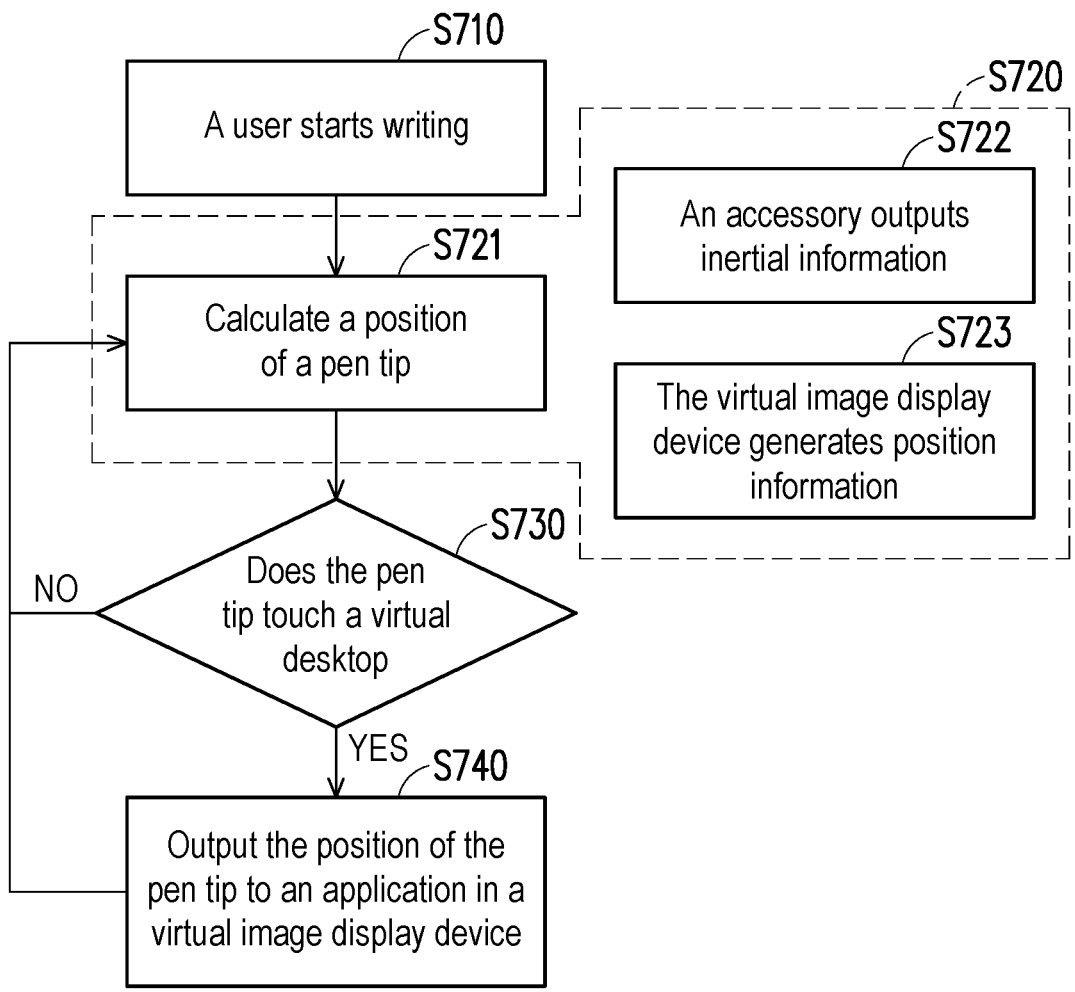
FIG. 7 shows a flowchart of a writing action of a virtual image display system of an embodiment of the invention.

Please refer to FIG. 7 below. FIG. 7 shows a flowchart of a writing action of a virtual image display system of an embodiment of the invention. In particular, in step S710, a user starts writing. In step S720, three sub-steps may be performed. In particular, in sub-step S722, an accessory provides inertial information thereof; in sub-step S723, a virtual image display device may generate position information of the accessory; and in sub-step S721, the virtual image display device may calculate a position of a pen tip of a virtual pen.

In step S730, the virtual image display device may determine whether the pen tip of the virtual pen is in contact with a virtual desktop. When the determination result is yes, step S740 is performed to output the position of the pen tip to an application program of the virtual image display device, and generate a corresponding virtual handwriting by executing an application program. When the determination result is no, sub-step S721 is performed again.

Figure 8:
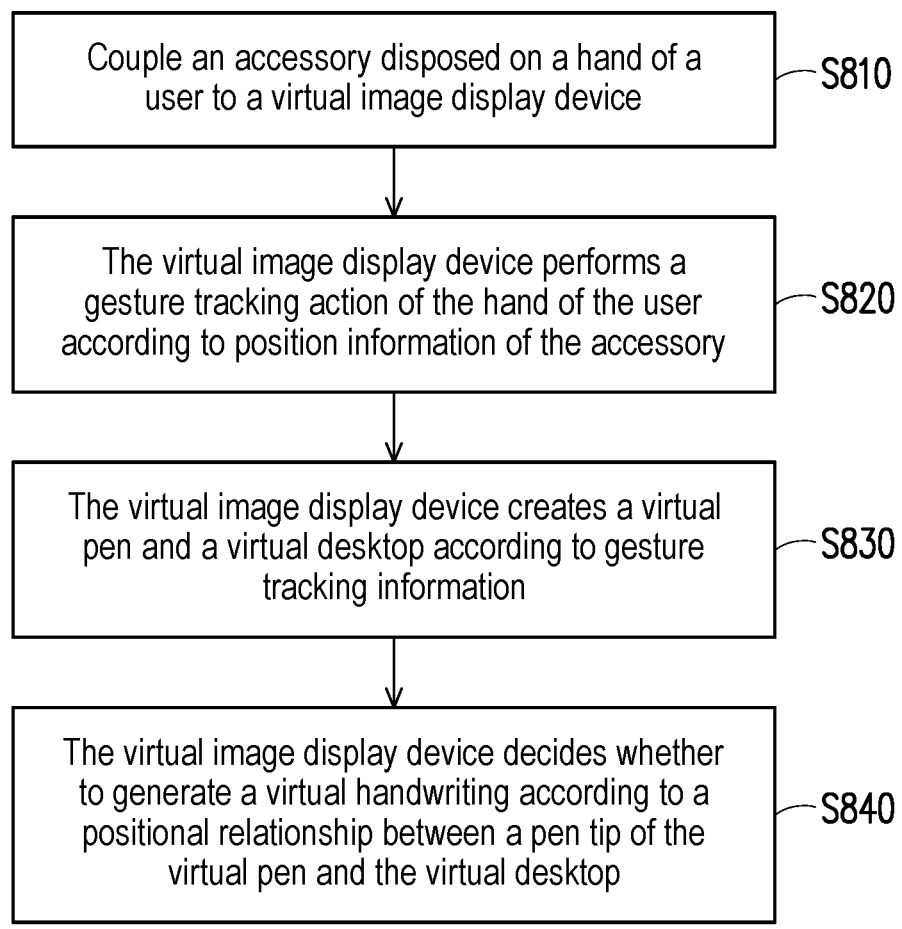
FIG. 8 shows a flowchart of a control method of a virtual image display system of an embodiment of the invention.

Please refer to FIG. 8 below. FIG. 8 shows a flowchart of a control method of a virtual image display system of an embodiment of the invention. In particular, in step S810, an accessory disposed on a hand of a user may be coupled to a virtual image display device via wireless pairing. In step S820, the virtual image display device performs a gesture tracking action of the hand of the user according to position information of the accessory. In step S830, the virtual image display device creates a virtual pen and a virtual desktop according to gesture tracking information. In step S840, the virtual image display device decides whether to generate a virtual handwriting according to a positional relationship between a pen tip of the virtual pen and the virtual desktop.

The implementation details of the above steps are described in detail in the above embodiments and are not described again here.

Based on the above, the virtual image display device of the invention performs the gesture tracking action of the user according to the inertial information of the accessory. Furthermore, according to the gesture tracking information, the virtual image display device of the invention may create the virtual pen and the virtual desktop, and by detecting the contact status of the virtual pen and the virtual desktop, may decide whether to generate the virtual handwriting. In this way, in the virtual image display system of the invention, there is no need to dispose a dedicated pen having complex functions for virtual reality. The user may complete the desired writing action by holding a general physical pen, or without holding a physical pen, thus effectively reducing costs and effectively improving the comfort of use.

What is claimed is:

1. A virtual image display system, comprising:
   a virtual image display device, wherein the virtual image display device is a head-mounted display; and
   an accessory worn on a finger of a user and coupled to the virtual image display device, wherein the accessory comprises an inertial sensor configured to measure inertial information of the accessory and an optical input interface configured to present a visual indicator to instruct a user to touch the optical input interface according to a direction of the visual indicator using the finger to generate a valid input command;
   wherein the virtual image display device comprising processors is configured to:
   receive the inertial information and obtain the positional information of the accessory;
   receive image information of the hand of the user by an image capturer;
   receive the input command transmitted from the optical input interface;
   perform a gesture tracking action of the hand of the user according to the received inertial information and positional information of the accessory, and image information captured from the virtual image display device;
   create a virtual pen and a virtual desktop on a display of the virtual image display device according to gesture tracking information; and
   decide whether to generate a virtual handwriting by determining a positional relationship between a pen tip of the virtual pen and the virtual desktop;
   display the virtual handwriting on the display of the virtual image display device according to the position of the pen tip of the virtual pen when the pen tip is in contact with the virtual desktop; and
   display a function menu on the display of the virtual image display device according to the input command received via the optical input interface of the accessory.

2. The virtual image display system of claim 1, wherein the accessory comprises:
   a first controller coupled to the inertial sensor; and
   a signal sending and receiving interface coupled to the controller, wherein the signal sending and receiving interface is configured to transmit the inertial information to the virtual image display device.

3. The virtual image display system of claim 2, wherein the accessory further comprises:
   the optical input interface coupled to the first controller, wherein the optical input interface is configured to transmit the input command to the controller.

4. The virtual image display system of claim 3, wherein the signal sending and receiving interface sends the input command to the virtual image display device.

5. The virtual image display system of claim 4, wherein the virtual image display device is configured to, in an initialization action:

perform a pairing action with the accessory;
making the display display the virtual desktop in a virtual space; and
adjust a position of the virtual desktop according to a gesture of the user via the gesture tracking action.

6. The virtual image display system of claim 2, wherein the virtual image display device is further configured to, in an initialization action:
make the display display the virtual pen in a virtual space;
instruct the user to align a pen tip of a physical pen held with the pen tip of the virtual pen; and
receive an input command transmitted by the user via the accessory to lock a position of the virtual pen.

7. The virtual image display system of claim 2, wherein the virtual image display device is further configured to, in an initialization action:
make the display display the virtual pen in a virtual space;
make the user hold a pen body of the virtual pen; and
receive an input command transmitted by the user via the accessory to lock a position of the virtual pen.

8. A control method of a virtual image display system, comprising:
coupling an accessory worn on a finger of a user to a virtual image display device, wherein the virtual image display device is a head-mounted display and the accessory comprises an inertial sensor configured to measure inertial information of the accessory and an optical input interface configured to present a visual indicator to instruct a user to touch the optical input interface according to a direction of the visual indicator using a finger to generate a valid input command;
receiving the inertial information and obtain the positional information of the accessory;
receiving image information of the hand of the user by an image capturer;
receiving the input command transmitted from the optical input interface;
performing a gesture tracking action of the hand of the user according to the received inertial information and positional information of the accessory, and image information captured from the virtual image display device;
creating a virtual pen and a virtual desktop on a display of the virtual image display device according to gesture tracking information; and
deciding whether to generate a virtual handwriting according to a positional relationship between a pen tip of the virtual pen and the virtual desktop;
displaying the virtual handwriting on the display of the virtual image display device according to the position of the pen tip of the virtual pen when the pen tip is in contact with the virtual desktop; and
displaying a function menu on the display of the virtual image display device according to the input command received via the optical input interface of the accessory.

9. The control method of claim 8, further comprising, in an initialization action:
making the virtual image display device and the accessory perform a pairing action;
making a display of the virtual image display device display the virtual desktop in a virtual space; and
making the virtual image display device adjust a position of the virtual desktop according to a gesture of the user via the gesture tracking action.

10. The control method of claim 9, further comprising, in the initialization action:
making the display display the virtual pen in the virtual space, wherein an extending direction of the virtual pen is perpendicular to a solid ground;
instructing the user to align a pen tip of a physical pen held with the pen tip of the virtual pen; and
receiving an input command transmitted by the user via the accessory to lock a position of the virtual pen.

11. The control method of claim 9, further comprising, in the initialization action:
making the display display the virtual pen in the virtual space, wherein an extending direction of the virtual pen is perpendicular to a solid ground;
making the user hold a pen body of the virtual pen; and
receiving an input command transmitted by the user via the accessory to lock a position of the virtual pen.

\* \* \* \* \*